Patented Feb. 23, 1937

2,071,558

UNITED STATES PATENT OFFICE 2,071,558

ARTICLE OF MANUFACTURE

Willard L. Morgan, Nutley, N. J., assignor to Sylvania Industrial Corporation, Fredericksburg, Va., a corporation of Virginia No Drawing. Original application July 13, 1935, Serial No. 31,229. Divided and this application May 27, 1936, Serial No. 82,051

8 Claims. (Cl. 106—40)

The invention relates in general to flameproof articles, and in particular to such articles formed of organic hydrophilic colloids, as well as to correlated improvements directed towards enhancing the utility of the articles formed from such colloids.

Articles formed from organic colloidal materials swelling in water, i. e., hydrophilic colloids, such, for example, as sheets and films of regenerated cellulose, are extensively used in the wrapping, packaging, textile and cordage arts, and also in window and stage decoration. These materials have a flammability at least equal to fibrous paper which restricts their use in certain installations, as theatrical stage sets and window decorations. To render such materials flameproof, the flameproofing agent must have the following requisites—(a) soluble in the organic hydrophilic colloidal material to such an extent as not to detract from the transparency of the material; (b) liquid at ordinary temperatures; and (c) relatively low vapor pressure. If possible, the flameproofing agent should be non-poisonous, non-odorous and light stable.

It is a general object of the invention to flameproof articles formed from organic hydrophilic colloidal material to such an extent as not to detract from their flexibility, transparency and strength.

A more specific object of the invention is to provide a sheet material formed from an organic hydrophilic colloidal material which is flameproofed, transparent and flexible.

A further object of the invention is to flameproof articles formed from organic hydrophilic colloidal materials so that the articles are not only non-flaming, but also non-flame-propagating.

Furthermore, the invention provides a regenerated cellulose in desired form, sheet or otherwise, which is flameproofed and does not propagate a flame readily.

Other objects of the invention will in part be obvious and will in part appear hereinafter.

The invention accordingly comprises an article of manufacture possessing the features, properties and the relation of elements which will be exemplified in the article hereinafter described and the scope of the invention will be indicated in the claims.

In accordance with the invention, articles formed from organic hydrophilic colloidal materials may be flameproofed by combining them with a water soluble salt of an aliphatic organic nitrogen base with an acid of phosphorus. Such salts have the following probable general formula $$(P)-(O-NR)_n$$

in which P represents an oxygen-containing phosphorus acid residue, NR represents an alkyl substituted ammonium radical and "$n$" is a whole number 1 to 4 (as in pyrophosphoric acid which contains four replaceable hydrogens).

Similar salts may be prepared utilizing hydroxyl-containing bases, as the ethanolamines, and these may have the following probable general formula $$(P)-(O-NR')_n$$

in which P represents an oxygen-containing phosphorus acid residue, NR' represents a hydroxy-alkyl substituted ammonium radical, and "$n$" is a whole number 1 to 4.

Suitable organic nitrogen bases comprise aliphatic compounds derivable from ammonia such, for example, as primary, secondary and tertiary aliphatic amines, tetra alkyl ammonium hydroxides and alkyl and hydroxyl derivatives of these bases. The organic nitrogen bases may be used singly or in compatible admixtures in forming salts with the oxygen-containing acids of phosphorus, such as orthophosphoric acid ($H_3PO_4$, tribasic), pyrophosphoric acid ($H_4P_2O_7$, tetrabasic), metaphosphoric acid ($HPO_3$, monobasic), hypophosphoric acid ($H_2PO_3$, monobasic), phosphorous acid ($H_3PO_3$, dibasic), hypophosphorous acid ($H_3PO_2$, monobasic).

With the polybasic phosphorous acids one or more of the replaceable hydrogens may be substituted by the aliphatic organic nitrogen base. For example, taking ethanolamine as a suitable organic nitrogen base and orthophosphoric acid as the phosphorous acid, there may be formed mono ethanolamine dihydrogen ortho phosphate, diethanolamine monohydrogen ortho phosphate and triethanolamine ortho phosphate. This entire series may be repeated with diethanolamine and again with triethanolamine.

It has been found that the salts of the aliphatic organic nitrogen base with an acid of phosphorous are capable, when used in sufficient concentration, of rendering organic hydrophilic colloidal materials flameproofed. For example, a sheet of regenerated cellulose is immersed in a solution containing 20% di- (tri-ethanolamine) mono hydrogen ortho phosphate

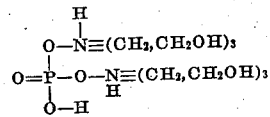

and the sheet dried. The treated sheet is flameproofed so that the material flames only as long as an externally-supplied flame is applied directly. When the external flame is removed, however, the flaming of the material ceases after a short period of time depending upon the concentration of the salt in the material. Compared with ordinary untreated fibrous paper, the treated material is also relatively non-flame-propagating.

It has now been found that the flameproofness of such articles may be further improved, so that the article is non-flaming and non-flame-propagating, by using in conjunction with the above mentioned salts a salt of ammonia with an inorganic acid selected from the group consisting of hydro-bromic, hydriodic, selenic, sulphuric and phosphoric. For example, a sheet of regenerated cellulose may be soaked in an aqueous solution comprising 5% by weight of ammonium bromide and 10% by weight of propylamine meta phosphate

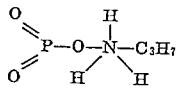

The treated sheet may be softened if desired and then dried. When a flame is brought into contact with the treated sheet, the material is destroyed by flameless combustion, but as soon as the flame is removed the combustion stops. The sheet material itself does not propagate the flame nor does the ash glow for any appreciable time.

It is to be understood that the salts of the aliphatic organic nitrogen bases with acids of phosphorus may be used singly or in a compatible mixture with one another, or combined in any suitable proportion with one or more of the ammonium salts above described. An ammonium salt may be present in the solution in an amount of from 3 to 10%. In general, it has been found sufficient to incorporate in the material from 10 to 20% by weight of the flameproofing agents herein described, although the upper limit is determined by the solubility of the flameproofing substance in the particular organic colloidal material to be treated, and the tackiness of the finished material, and the lower limit by the flameproofness desired.

The articles of the invention may comprise a variety of film-forming organic hydrophilic colloids, for example, gelatin, casein, and inflammable cellulose derivatives such as cellulose ethers, cellulose oxyethers and cellulose hydrate. The cellulose hydrate may be regenerated from viscose, cuprammonium cellulose, or from aqueous solutions of inorganic salts, such as zinc chloride; also from the deesterification of cellulose esters, such as acetates and nitrates. The organic colloids may be treated while in the form of films, filaments, sheets, bands, hollow bodies and other articles fabricated in whole or in part from such colloids.

The flameproofing agents may be added to the original solutions of the colloids from which articles are to be formed, or the articles may be impregnated by contacting them with an aqueous solution of a flameproofing agent. The flameproofing agents of the present invention impart a high degree of flameproofness to organic hydrophilic colloids without detracting from the transparency, flexibility and strength thereof. The flameproofing agents are further characterized by being water soluble, odorless, tasteless, non-poisonous and non-crystallizing when incorporated in the colloid. Where the aliphatic organic nitrogen base contains hydroxyl groups therein, it has been found that the flameproofing agent also serves as a softening agent for the colloid, thus improving the flexibility of the articles formed therefrom.

In the appended claims the expression "flameproof" is intended to designate that degree of non-inflammability at which the flameproofed material will not show a self-sustaining combustion when ignited and the external flame removed, and when the ambient atmosphere is at room temperature.

The fireproofing compositions disclosed herein are claimed in my co-pending application Ser. No. 31,229 filed July 13, 1935, of which the present application is a division.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A flexible transparent article of manufacture comprising an organic hydrophilic colloid selected from the group consisting of gelatine, casein, cellulose ethers, cellulose oxy-ethers and cellulose hydrate having incorporated therewith a water-soluble salt of an aliphatic nitrogen base with an acid of phosphorus in an amount sufficient to effect a flameproofing of said colloid.

2. A flexible transparent article of manufacture comprising a sheet of regenerated cellulose having incorporated therein from about 10 to about 20% of di- (tri-ethanolamine) monohydrogen orthophosphate whereby flameproofing of the regenerated cellulose is effective.

3. A flexible transparent article of manufacture comprising an inflammable cellulose derivative having incorporated therewith a water-soluble salt of an aliphatic nitrogen base with an acid of phosphorus in an amount sufficient to effect a flameproofing of the article.

4. A flexible transparent article of manufacture comprising regenerated cellulose having incorporated therewith a water-soluble salt of an aliphatic nitrogen base with an acid of phosphorus in an amount sufficient to effect a flameproofing of the article.

5. A flexible transparent article of manufacture comprising a sheet or film of regenerated cellulose having incorporated therewith from about 10 to about 20% of a water-soluble salt of an aliphatic nitrogen base with an acid of phosphorus.

6. A flexible transparent article of manufacture comprising an organic hydrophilic colloid selected from the group consisting of gelatine, casein, cellulose ethers, cellulose oxy-ethers and cellulose hydrate having incorporated therewith a water-soluble salt of an ethanolamine with an acid of phosphorus in an amount sufficient to effect a flameproofing of the article.

7. A flexible transparent article of manufacture comprising an organic hydrophilic colloid selected from the group consisting of gelatine, casein, cellulose ethers, cellulose oxy-ethers and cellulose hydrate having incorporated therewith a water-soluble salt having the following probable general formula:

$$(P)-(O-NR)_n$$

in which P represents an oxygen-containing phosphorous acid residue, NR is an alkyl substituted ammonium radical and "$n$" is a whole number 1 to 4, said salt being present in an amount sufficient to effect flameproofing of said colloid.

8. A flexible transparent article of manufacture comprising an organic hydrophilic colloid selected from the group consisting of gelatine, casein, cellulose ethers, cellulose oxy-ethers and cellulose hydrate having incorporated therewith a water-soluble salt having the following probable general formula:

$$(P)-(O-NR')_n$$

in which P represents an oxygen-containing phosphorous acid residue, NR' represents a hydroxy-alkyl substituted ammonium radical and "$n$" is a whole number 1 to 4, said salt being present in an amount sufficient to effect flame-proofing of said colloid.

WILLARD L. MORGAN.